United States Patent [19]

Jackson

[11] 4,368,791
[45] Jan. 18, 1983

[54] POSTAGE ESTIMATOR DEVICE

[76] Inventor: James M. Jackson, 4167 S. Wheeling, Tulsa, Okla. 74104

[21] Appl. No.: 196,624

[22] Filed: Oct. 14, 1980

[51] Int. Cl.³ .............................................. G01G 1/18
[52] U.S. Cl. ................................... 177/126; 177/250; 177/262
[58] Field of Search ............... 177/126, 246, 250, 245, 177/262, 264, 251, 235, 236, 237

[56] References Cited

U.S. PATENT DOCUMENTS

| | | | |
|---|---|---|---|
| 178,673 | 6/1876 | Rhea | 177/126 |
| 953,522 | 3/1910 | Fink | 177/262 X |
| 1,641,596 | 9/1927 | Mahloy | 177/236 |
| 2,383,408 | 8/1945 | Morgan | 177/262 X |
| 3,786,885 | 1/1974 | Mills | 177/245 |
| 4,047,586 | 9/1977 | Dlugos | 177/210 R |

*Primary Examiner*—Joseph W. Hartary
*Attorney, Agent, or Firm*—Head, Johnson & Stevenson

[57] ABSTRACT

A device for estimating postage requirements for envelopes and the like, and comprising a holder for supporting the envelope during the estimating process, a balancing lever pivotally secured to the holder and having a fulcrum about which the device may rock, and a recess provided at the outer end of the lever for receiving weighted elements therein which are calculated to generally counter balance the envelope in a manner for providing an estimate of the postage requirements for mailing of the letter in the postal system.

2 Claims, 5 Drawing Figures

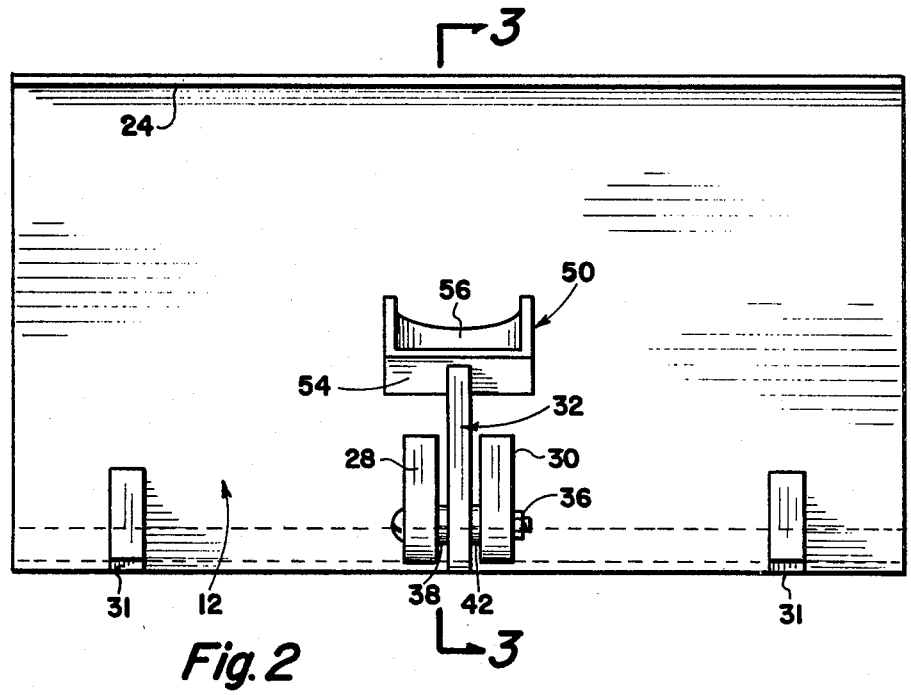
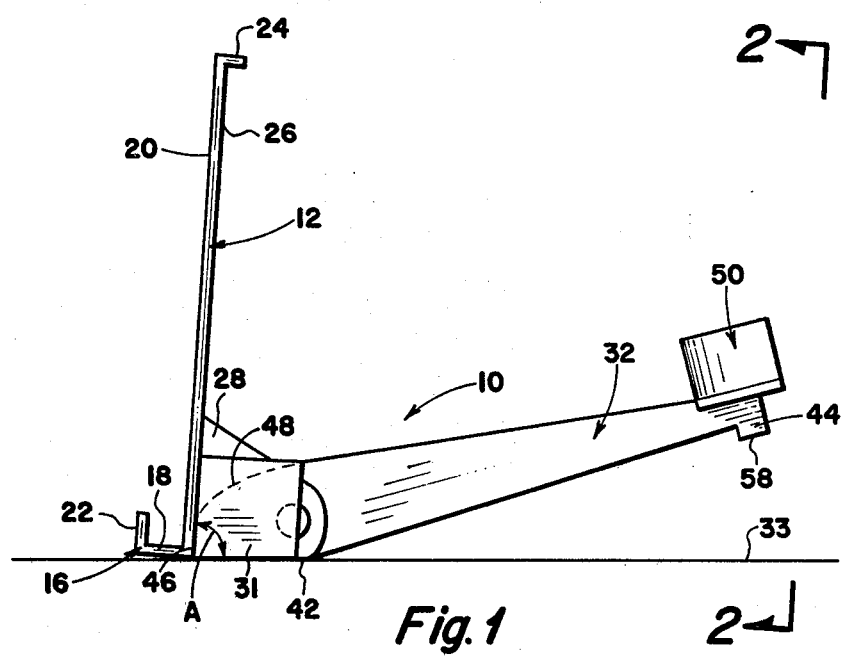

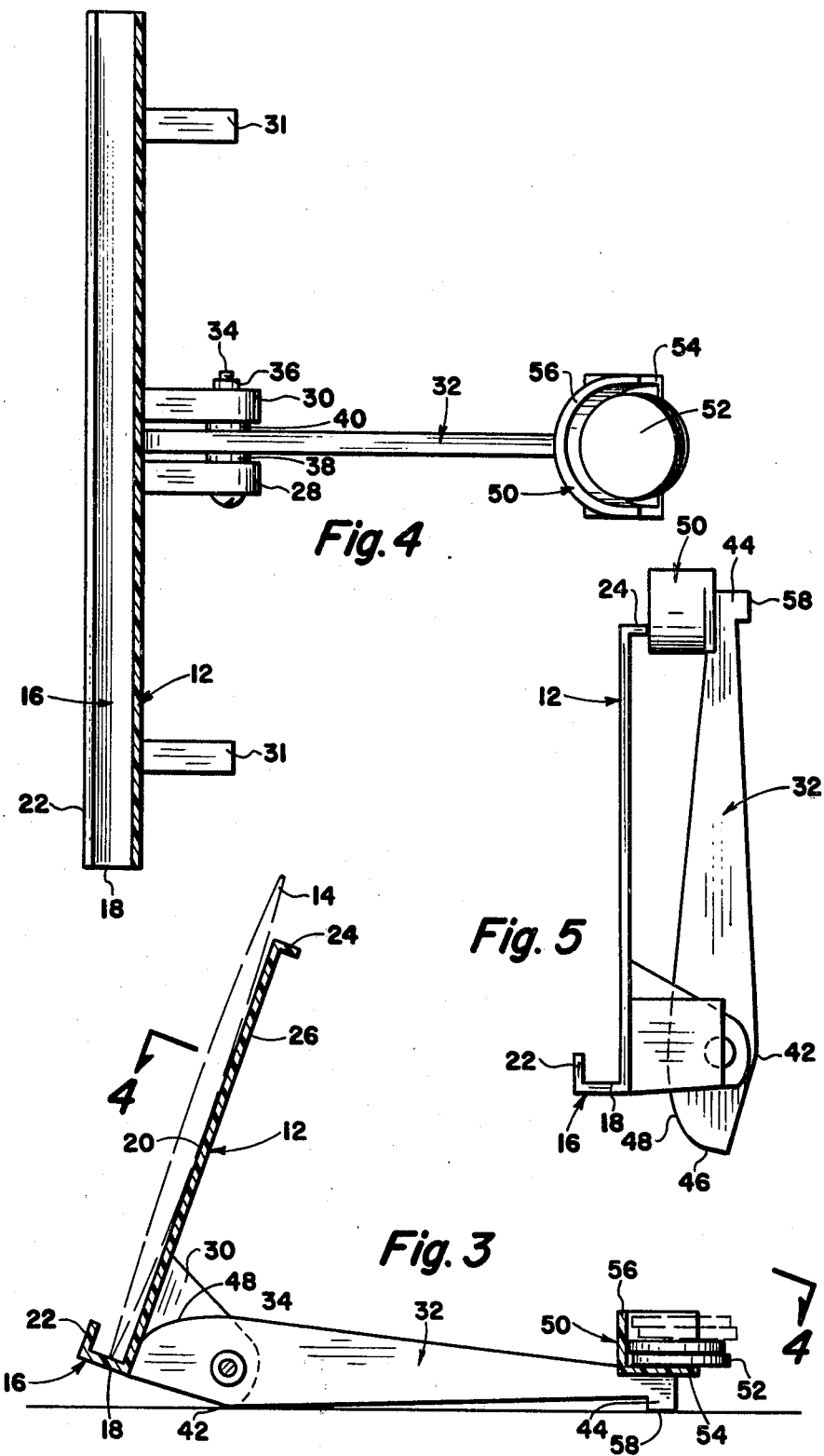

POSTAGE ESTIMATOR DEVICE

BACKGROUND OF THE INVENTION

1. Field of the Invention

This invention relates to estimating measuring devices and more particularly, a device for estimating postage requirements for envelopes, and the like.

2. Description of the Prior Art

Many persons utilizing the United States Postal Service do not have ready access to weighing equipment for the determination of the postage necessary for the mailing of a letter, or the like. It is frequently difficult to ascertain whether or not additional position, or postage above the minimum amount is required for assuring that the letter will be carried properly through the postage system. As a result several devices have been developed for "home use" which provide a relatively close estimate of the required postage for a letter, such as those shown in the Mills U.S. Pat. No. 3,786,885. These devices have certain disadvantages, however, in that the envelope usually lays in a substantially horizontally disposed position on a rule member, with the envelope preferably spaced at a selected distance from the fulcrum of the rule whereby the rule functions in the manner of a weighing scale for roughly estimating the postage required for the mailing of the item. The envelope tends to slide along the surface of the rule during the estimating operation, and as a result the operation of these devices is relatively inefficient.

SUMMARY OF THE INVENTION

The present invention contemplates a novel device for estimating the postage requirements for mailing of an envelope or the like wherein a support plate having a trough extending along the lower edge thereof is provided for receiving the envelope therein and supporting the envelope in a substantially upright position during the estimating operation. A lever means is pivotally secured to the support plate and is provided with a fulcrum about which the device pivots during estimating of the postage requirements. A housing or recess is provided at the outer end of the lever for receiving selected weight members which generally correspond to the units of weight utilized in postage determination. For example, two penny coins in combination have been found to weigh an appropriate amount for utilization with the length of the lever arm whereby the two coins may be deposited within the recess for approximating compensation for a one ounce envelope supported in the support plate. Thus, if the two coins placed in the housing or recess balance the device about the fulcrum, then the proper postage for the envelope should be that amount required for the mailing of an item having a weight of one ounce or less. Similarly, of course, additional coins may be added to the recess or housing for compensating for an envelope weighing more than the one ounce. Thus, the device permits a relatively close estimate of the weight of the envelope for permitting a general determination of the postage requirements for mailing of the envelope. The pivotal lever arm may be moved to a position substantially adjacent the support plate for facilitating storage thereof during periods of non-use. The novel device is simple and efficient in operation and economical and durable in construction.

BRIEF DESCRIPTION OF THE DRAWINGS

FIG. 1 is a side elevational view of a postage estimator device embodying the invention, and depicted in a position for utilization of the device.

FIG. 2 is a view taken on line 2—2 of FIG. 1.

FIG. 3 is a view taken on line 3—3 of FIG. 2, with coins weighted elements added thereto and an enveloped depicted in broken lines for purposes of illustration.

FIG. 4 is a sectional view taken on line 4—4 of FIG. 3.

FIG. 5 is a side elevational view of a postage estimator device embodying the invention, with the device depicted in the collapsed position thereof for storage purposes.

DETAILED DESCRIPTION OF THE PREFERRED EMBODIMENT

Referring to the drawings in detail, reference character 10 generally indicates a postage estimator device comprising a substantially flat plate 12, preferably of a rectangular configuration generally simulating the planar configuration of a letter-type envelope 14 (shown in broken lines in FIG. 3), and having a trough member 16 extending longitudinally along the lower edge thereof as viewed in the drawings. The trough member 16 preferably includes a ledge or flange member 18 extending outwardly from one face 20 of the plate 12 at substantially right angles thereto for receiving one edge of the envelope 14 thereagainst, and a flange member 22 extending upwardly at rightly angles therefrom in spaced relation to the surface 20 for facilitating temporarily retaining the envelope 14 in position in the trough 16 as will be hereinafter set forth in detail. The upper edge of the plate 12 is preferably provided with a rearwardly extending flange 24 disposed substantially perpendicularly with respect to the opposite surface 26 of the plate 12, but not limited thereto.

A pair of spaced flanges 28 and 30 are secured to the surface 26 of the plate 12, or may be integral therewith as desired, and extend substantially perpendicularly outwardly therefrom as particularly shown in FIG. 4. The flanges 28 and 30 are preferably disposed in the proximity of the lower edge of the plate 12, and are substantially centrally disposed therealong for receiving a lever means 32 therebetween. In addition it is preferable to provide a pair of spaced support members or legs 31 which extend substantially perpendicularly outwardly from the surface 26 for supporting the plate 12 in a substantially upright position from a suitable horizontally disposed surface 33 during use of the apparatus 10 as will be hereinafter set forth. The angle A between the lower edge of the support member 31 and the plate of the plate 12 is particularly selected whereby the plate will be supported at an angle of approximately 10° from the vertical during use of the device 10 in order that gravity will facilitate retaining of the envelope 14 in position in the trough 16 and against the surface 20 during a postage estimating operation as will be hereinafter set forth in detail.

The lever means 32 is suitably journalled on a pivot shaft 34 which extends through the flanges 28 and 30, and is secured therein in any well known manner, such as by a lock nut 36, or the like. It is also preferable to provide a pair of spacers or bushings 38 and 40 on the shaft 38 on the opposite sides of the lever means 32 and interposed between the lever and the flanges 28 and 30, respectively, for retaining the lever 32 substantially centered between the flanges, and for facilitating pivoting of the lever about the shaft 34 as will be hereinafter set forth. A fulcrum point 42 is provided along the lower edge of the lever means 32, and an outwardly extending stop member 44 is provided at the outer end of the lower edge of the lever means 32. The inner end of the lever 32 is provided with a substantially straight portion 46 conterminous with the lower edge thereof for selective engagement with the surface 26 of the plate 12, and the straight portion 46 blends into an arcuate portion 48 which connects the upper edge of the lever 32 with the flat portion 46.

A housing 50 is secured to or integral with the outer end of the lever 32 and is disposed along the upper edge thereof for receiving suitable weighted elements, such as coins 52 or the like, therein for a purpose as will be hereinafter set forth. The housing 50 preferably comprises a substantially flat lower plate 54 having a semi-cylindrical wall 56 extending outwardly therefrom at substantially right angles with respect thereto. Thus, the top and substantially one half the circumference of the housing 50 is open for facilitating insertion of the coins 52 therein. In addition, it is preferable that the plane of the plate 54 be disposed at an angle with respect to the lower edge 58 of the stop member 44 whereby gravity urges the coins 52 against the wall 56 for precluding loss of the coins during a postage estimating operation as will be hereinafter set forth. Alternatively, the plate 54 may be of sufficient width for supporting the coins sufficiently for precluding loss thereof from the housing 50.

When it is desired to estimate the postage required for mailing of the envelope 14, the lever means 32 may be pivoted about the shaft 34 in a direction away from the surface 26 of the plate 12 until the flat portion 46 of the lever 32 engages the surface 26, as shown in FIG. 1. The device 10 may then be placed on the horizontal working surface 33, whereupon the legs or support members 31 will engage the surface 33 as particularly shown in FIG. 1. In this position, the plane of the plate 12 is substantially 10° from the vertical, and the envelope 14 may be placed against the surface 20 of the plate 12, with the lower edge of the envelope 14 resting in or being disposed in the trough 16.

It has been found that the weight of penny coins in combination with the distance of the housing 50 from the fulcrum point 42 is such that two pennies placed within the housing 50 will compensate for an envelope weighing one ounce. Thus, two pennies or other suitable weighted objects may be placed in the housing 50, as shown in solid lines in FIG. 3. If the lever means 32 pivots about the fulcrum point 42 in such a manner that the stop member 44 engages the surface 33, then it is evident that the envelope 14 and contents thereof weigh one ounce or less, and this permits the selection of the proper postage for mailing of the envelope. Of course, if the two pennies disposed within the housing 50 do not overcome the weight of the envelope supported in the trough 16, then it is evident that the envelope weighs more than a single ounce, which indicates additional postage or extra postage should be required for the mailing of the envelope. In this event, two more pennies, or the like, may be placed in the housing 50, and if this "tips" the lever means 32 in such a manner that the stop member 44 engages the surface 33, then it can be determined that the envelope 14 and contents do not weigh more than two ounces, and thus the required amount of postage may be determined.

When the device 10 is not in use, the lever means 32 may be pivoted about the pivot shaft 34 in a direction toward the surface 26 whereby the lever will be disposed substantially adjacent the surface 26, thus providing a convenient, compact arrangement for the device 10 to facilitate storage thereof until such time as further use is required. It may be preferable that the outer end of the flange 24 engage the outer extremity of the wall 56 for limiting the movement of the lever means 32 in the direction toward the surface 26, thus precluding any unwanted projection or protrusion of the housing wall 56 beyond the surface 20 in the collapsed position of the device 10. It is to be noted that the arcuate surface 48 of the inner end of the lever means 32 facilitates the movement of the lever 32 in the direction toward the collapsed position, and the engagement of the flat portion 46 with the surface 26 limits the movement of the lever 32 in the direction toward the extending position. This engagement of the flat portion 46 with the surface 26 assures that the portion of the lever arm 32 extending between the fulcrum 42 and the surface 26 will be disposed substantially flat against the support surface 33, thus assuring that the outer portion of the arm 32 will be disposed at the proper angle with respect to the surface 33 for providing the proper counter balancing action during the weighing of the envelope 14 for the approximate determination of the required postage.

From the foregoing it will be apparent that the present invention provides a novel device for estimating the postage requirements for mailing of a letter, or the like, in the postal system, particularly designed for use under circumstances wherein official or relatively accurate weight apparatus is not available, such as in a home environment, or the like. The novel device comprises a holder plate disposed at a rearwardly slanting angle for supporting the envelope in a substantially upright position but permitting gravity to act thereof for facilitating retaining of the envelope in position during the postage determination operation. Lever means is pivotally secured to the holder plate and is provided with a fulcrum to provide a pivot connection of the lever means with a horizontal supporting surface. Housing means is provided at the outer end of the lever particularly spaced from the fulcrum point a distance whereby suitable weighted elements, such as coins, may be deposited therein for counter balancing a known weight, thus permitting an estimation of the weight of the envelope and contents whereby a generally close estimate may be made of the postage required for the mailing of the envelope in the postal system.

Whereas the present invention has been described in particular relation to the drawings attached hereto, it should be understood that other and further modifications, apart from those shown or suggested herein may be made within the spirit and scope of this invention.

What is claimed is:

1. A device for estimating postage requirements for envelopes and comprising holder plate means adapted for disposition on a horizontal surface for receiving the envelope thereagainst and supporting the envelope by gravity during the estimating operation, lever means having one end pivotally secured to the holder plate means and movable between collapsed and extended positions with respect to the holder plate means, recess means provided on the outer end of the lever means for receiving selected weighted elements therein, fulcrum means provided on said lever means between the recess means and the holder means whereby the weighted elements counterbalance a known weight carried by the holder plate means, said counterbalancing providing a determination of approximate postage requirements for the envelope disposed in the holder means, the lever means being provided with means limiting the pivotal movement thereof in one direction for controlling the extended position of the lever means whereby said fulcrum means is properly positioned with respect to the holder means for said counterbalance operation, said recess means comprising open housing means for receiving said weighted elements therein, the open housing means comprising substantially flat plate means for receiving the weighted means thereon, and arcuate wall means extending outwardly from said plate means for receiving the weighted means thereagainst, and wherein the holder means comprises a substantially flat plate for receiving the planar configuration of the envelope thereagainst, said flat plate being disposed at an angle with respect to the vertical in the extended position of the lever means whereby gravity acts on the envelope for facilitating retaining of the envelope in a substantially upright position against said flat plate during a postage estimating operation, and wherein said holder means includes trough means extending longitudinally along the lower edge thereof in the extended position of the lever means for receiving the lower edge of the envelope therein during a postage estimation operation.

2. A device for estimating postage requirements for envelopes as set forth in claim 1 wherein the weighted elements are coins selected for counter balancing approximately one ounce of weight carried by the holder means.

* * * * *